United States Patent [19]

Haeck

[11] 4,437,554
[45] * Mar. 20, 1984

[54] FLUID SHEAR COUPLING APPARATUS
[75] Inventor: Paul J. Haeck, Indianapolis, Ind.
[73] Assignee: Household Manufacturing Inc., Prospect Heights, Ill.
[*] Notice: The portion of the term of this patent subsequent to Sep. 13, 2000 has been disclaimed.
[21] Appl. No.: 275,211
[22] Filed: Jun. 19, 1981
[51] Int. Cl.³ .................. F16D 35/00; F16D 43/25
[52] U.S. Cl. .......................... 192/58 B; 192/82 T; 192/103 R
[58] Field of Search ............... 192/58 B, 82 T, 103 R

[56]  References Cited
U.S. PATENT DOCUMENTS

| 3,174,600 | 3/1965 | Oldberg | 192/58 |
| 3,191,733 | 6/1965 | Weir | 192/103 R X |
| 3,217,849 | 11/1965 | Weir | 192/82 T |
| 3,323,623 | 6/1967 | Roper | 192/58 |
| 3,498,431 | 3/1970 | Sutaruk | 192/57 |
| 3,613,847 | 10/1971 | Masai | 192/58 B |
| 3,688,884 | 9/1972 | Perrin et al. | 192/58 B |
| 3,809,197 | 5/1974 | Clancey | 192/58 B |
| 3,856,122 | 12/1974 | Leichliter | 192/58 B |
| 3,964,582 | 6/1976 | Mitchell | 192/58 B |
| 4,004,668 | 1/1977 | Blair | 192/58 B |
| 4,007,819 | 2/1977 | Maci | 192/58 B |
| 4,116,318 | 9/1978 | Crisenbery et al. | 192/58 B |
| 4,235,322 | 11/1980 | Sutaruk | 192/58 B |
| 4,246,995 | 1/1981 | Gee | 192/58 B |
| 4,295,550 | 10/1981 | Hayashi | 192/82 T X |
| 4,298,111 | 11/1981 | Hayashi | 192/82 T X |

FOREIGN PATENT DOCUMENTS 1074451 7/1967 United Kingdom ............... 192/58 B
1226309 3/1971 United Kingdom ............... 192/58 B Primary Examiner—Rodney H. Bonck
Attorney, Agent, or Firm—Woodard, Weikart, Emhardt & Naughton

[57] ABSTRACT

A fluid shear coupling apparatus is disclosed herein which includes a driving member received within a working chamber defined by a driven member. The driven member is mounted with needle bearings to a shaft portion of the driving member to have the members rotatable about a common axis. The driving and driven members include complementary shaped and positioned fluid shear and thrust surfaces defining fluid shear and thrust chambers, respectively, therebetween and cooperable with shear fluid within the chamber to transmit torque and axial thrust loads between the members. The fluid shear surfaces are defined by interdigitated ridges and grooves. A shear fluid reservoir is located in the central portion of the driven member and passageways lead from an annular groove and cylindrical cavity adjacent the driving member back to the reservoir. A recycle passageway also leads from the annular groove and connects with the working chamber at a radially-inward location to provide recirculation of shear fluid through the working chamber. Several projections and dams are received within the cylindrical cavity and annular groove to provide shear surfaces for transmitting torque between the driving and driven members, and also to facilitate the pumping of the shear fluid from the working chamber back to the reservoir or through the recycle flow path. A weighted valve and associated temperature-responsive valve provide for modulated coupling between the driving and driven members.

19 Claims, 5 Drawing Figures

FLUID SHEAR COUPLING APPARATUS

REFERENCE TO RELATED APPLICATION

This case is a continuation-in-part of my earlier copending application, Ser. No. 219,228, filed on Dec. 22, 1980, and now U.S. Pat. No. 4,403,684.

BACKGROUND OF THE INVENTION

1. Field of the Invention

The present invention relates to a fluid shear coupling apparatus, and particularly to an apparatus having improved operational and maintenance features.

2. Description of the Prior Art

A variety of fluid shear couplings are known in the art and which typically include a driving member received within a working chamber defined by the driven member. Various, specific fluid shear surfaces and mounting means have been proposed. It is an object of the present invention to provide a fluid shear coupling apparatus which has improved operational and maintenance features over those of the prior art.

In U.S. Pat. No. 3,809,197, issued to Clancey on May 7, 1974, there is disclosed a viscous coupling including relatively rotatable input and output coupling members. These coupling members include a plurality of interdigitated lands and grooves which define a shear space therebetween and which are cooperable with viscous shear fluid in the shear space to transmit torque between the coupling members. A temperature-responsive valve means is included for controlling flow of viscous fluid from a reservoir chamber to the shear space. The output coupling member is mounted to a shaft of the input coupling member by means of ball bearings. A similar viscous coupling is disclosed in U.S. Pat. No. 3,856,122, issued to Leichliter on Dec. 24, 1974. The Leichliter coupling includes interdigitated lands and grooves defining a shear space between input and output coupling members. The Leichliter coupling is specifically designed to improve heat dissipation by means of the particular location of the shear surfaces and by the use of cooling fins rotating at the input speed to generate a greater blower action through the fins. Similar fluid shear couplings are disclosed in U.S. Pat. Nos. 3,498,431, issued to Sutaruk on Mar. 3, 1970; 3,323,623, issued to Roper on June 6, 1967; and 3,174,600, issued to Oldberg on Mar. 23, 1965.

In U.S. Pat. No. 4,004,668, issued to Blair on Jan. 25, 1977, there is disclosed a fluid shear coupling which includes pumping grooves extending across the concentric ridges or lands defining the fluid shear surfaces. These secant grooves extend across the top of the interdigitated ridges of the driving member and of the housing interior to cause the shear fluid to move generally radially for the purpose of inhibiting high temperature build-ups.

Depending upon the amount of the shear fluid in the drive chamber, the degree of rotary coupling between the driving member and the driven member is varied. This variance is usually controlled in the prior art by a temperature responsive valve assembly, the valve opening to admit a larger quantity of fluid to the drive chamber when high cooling requirements exist. Such assemblies often include a shear fluid passageway between the radially outermost portion of the drive chamber in which the drive rotor is positioned and the reservoir chamber. The shear fluid is deflected so as to flow from the radially outermost part of the drive chamber through the passageway back to the reservoir chamber.

One such device of this type is described in U.S. Pat. No. 4,007,819 to Maci on Feb. 15, 1977. In general, such devices lower the power lost to the radiator cooling fan by correlating the fan power requirement with the engine cooling requirement at various ambient temperatures.

In most temperature controlled, viscous fan drives currently manufactured, the change from partial engagement or coupling to full engagement occurs very rapidly upon the attainment of a certain activating air temperature. Upon actuation of the temperature responsive valve assembly, there is a sharp or sudden change in output speed between the partially engaged condition and a fully engaged condition. While such a characteristic may be desirable for many applications there are certain other applications, such as farm tractors, which operate more effectively and more efficiently with a modulated engagement. The term "modulated" is here used to denote a gradual, stable change in fan speed as a function of cooling system requirements, as distinguished from an abrupt or rapid change.

SUMMARY OF THE INVENTION

Briefly described, the present invention includes a fluid shear coupling apparatus having a driving member defining a fluid shear surface and being received within a driven member having a complementary fluid shear surface. A fluid shear chamber is defined by the shear surfaces and functions with shear fluid within the chamber to transmit torque between the driving and driven members. In one aspect of the present invention, the coupling apparatus includes first flow means for providing a flow of shear fluid between a shear fluid reservoir and the working chamber within which the driving member is received, and a second flow means for moving shear fluid from a radially-outward location in the working chamber directly to a radially-inward location of the working chamber intermediate the shear surfaces.

It is an object of the present invention to provide a fluid shear coupling apparatus which has advantageous and improved coupling and maintenance features.

It is another object of the present invention to provide a fluid shear coupling apparatus which has improved modulation characteristics.

Another object of the present invention is to provide a fluid shear coupling apparatus which has improved means for pumping the shear fluid from the working chamber back to the reservoir or in other flow paths.

Further objects and advantages of the present invention will become apparent from the description of the preferred embodiment which follows.

DESCRIPTION OF THE PREFERRED EMBODIMENT

Figure 1:
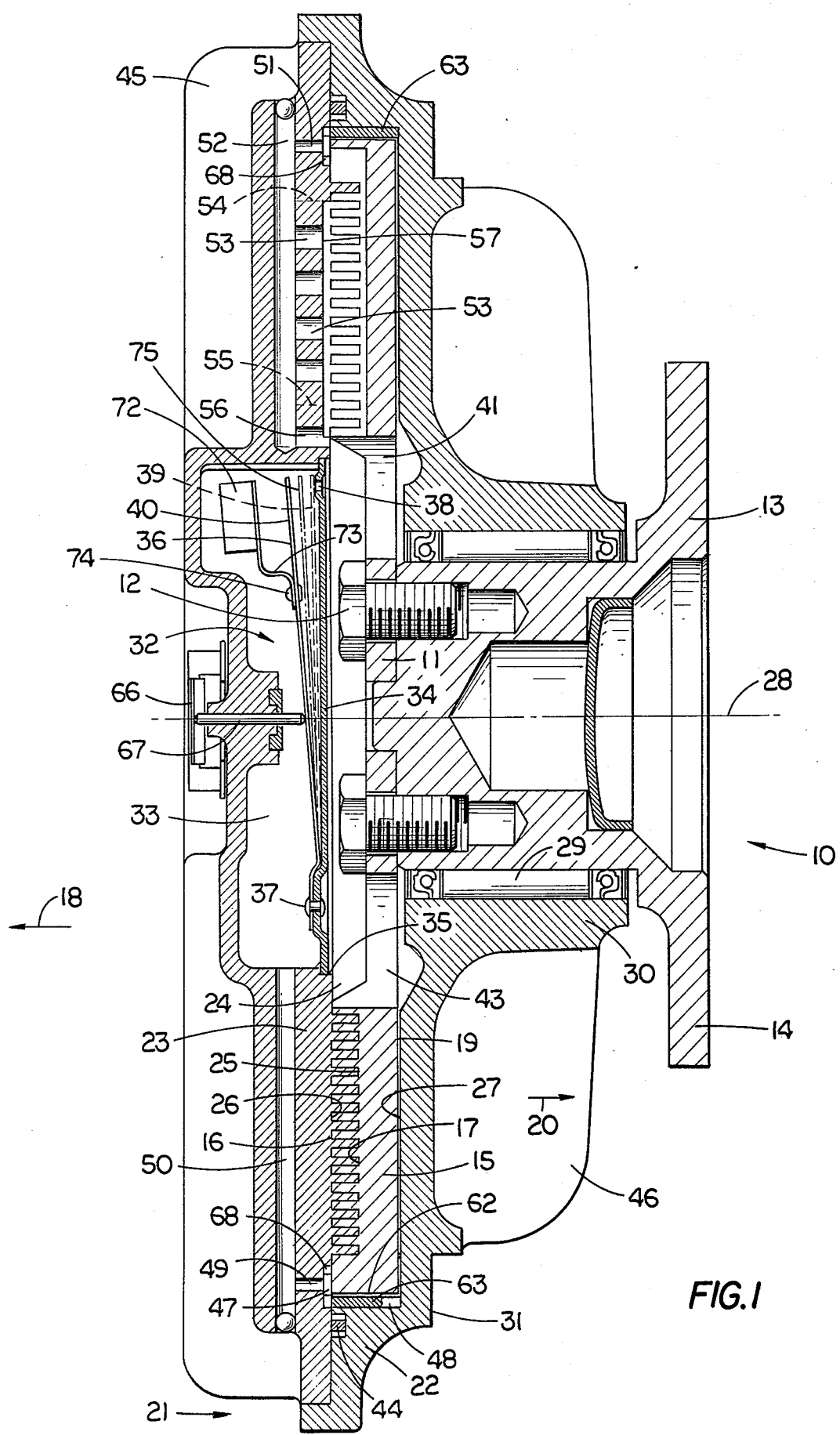
FIG. 1 is a side, cross-sectional view of a fluid shear coupling apparatus constructed in accordance with the present invention
Figure 2:
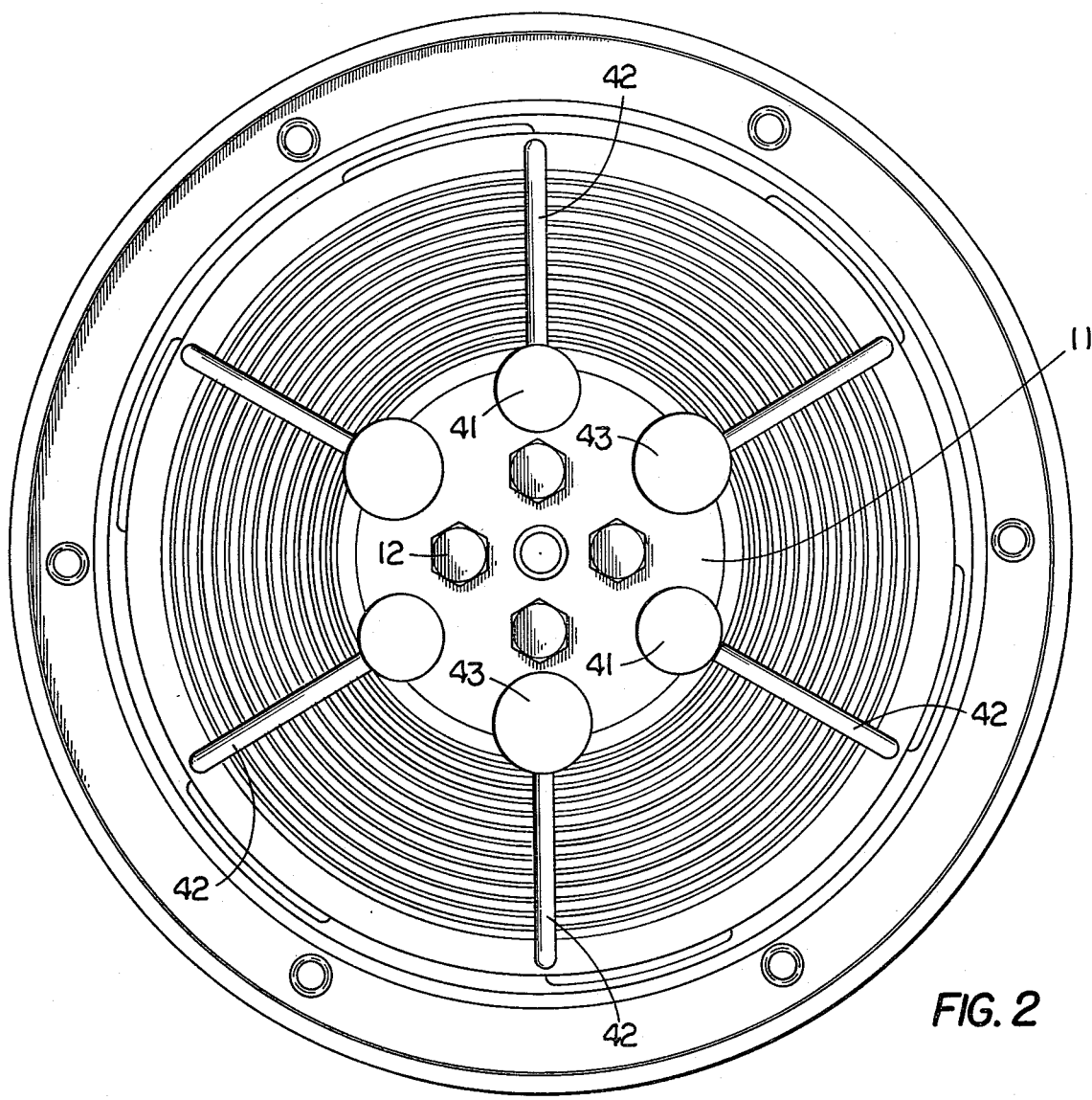
FIG. 2 is a front, elevational view of the apparatus of FIG. 1, and particularly showing the driving member and portions of the bearing housing with the cover removed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a fluid shear coupling apparatus 10 constructed in accordance with the present invention. The apparatus includes a driving member 11, also known as the rotor, mounted with bolts 12 to a shaft 13. The shaft 13 is connectable to an external drive source in conventional fashion, typically by means of bolts received through apertures (not shown) in the mounting flange portion 14 of the shaft. The driving member 11 includes a disc-shaped portion 15 defining several annular ridges 16 and grooves 17 facing in a first axial direction 18. The disc-shaped portion 15 of the driving member also defines a first thrust surface 19 facing in a second axial direction 20 opposite the first axial direction.

The coupling apparatus further includes a driven member 21 including a bearing housing 22 and a cover 23. The driven member defines a working chamber 24 within which the driving member 11 is received. The cover of the driven member defines several annular ridges 25 and grooves 26 facing in the second axial direction 20 and received adjacent the respective grooves 17 and ridges 16 of the driving member. This close, spaced-apart positioning of the complementary shaped grooves and ridges provides opposed shear surfaces defining a fluid shear chamber therebetween. In conventional fashion, the reception of shear fluid within this fluid shear chamber will provide for the transmission of torque between the driving member and the driven member. The bearing housing 22 also defines a second thrust surface 27 facing in the first axial direction 18 and positioned adjacent and spaced from the first thrust surface 19. This close, spaced-apart positioning of the first and second thrust surfaces provides a thrust chamber therebetween, and also provides for shear action between the thrust surfaces to increase torque-transmission between the driving and driven members. Consequently, the reception of shear fluid within the thrust chamber will facilitate the transmission of axial thrust loads between the driving member and the driven member.

Mounting means are provided for mounting the driven member 21 to the driving member 11 with each member being rotatable about a common axis 28. In the preferred embodiment, the mounting means includes needle bearing 29 received between a sleeve portion 30 of the bearing housing 22 and the shaft 13. The needle bearing 29 does not carry axial loads, and the provision of the thrust chamber will therefore provide for the carrying of axial thrust loads between the driving and driven members. It will be appreciated that in this preferred embodiment of the present invention, the thrust surfaces 19 and 27 are positioned on the side of the driving member 11 which will require the carrying of the axial thrust loads. For example, in a typical application of the present invention, a fan (not shown) is mounted to the fan mounting surface 31 and is oriented to move air in the second axial direction 20. Thus, the force of the fan urges the driven member 21 in the first axial direction 18, and will cause the axial thrust loads to be carried by the thrust surfaces 19 and 27.

In accordance with the preferred embodiment of the present invention, at least a portion of the first and second thrust surfaces is coated with a layer of non-metallic, anti-friction material. The material may be coated on either one or both of the first and second thrust surfaces, and is preferably located on the driving member. It is also preferable that the thrust surfaces, and therefore the coating, be positioned opposite the shear surfaces of the driving and driven members. It will be seen that the material coating protects the contiguous surfaces of the driving and driven members whenever the thrust surfaces rub against one another.

The non-metallic, anti-friction material may comprise any material which may be applied to the indicated surfaces, will provide the indicated protection, and exhibits the required durability and performance characteristics for this application. Most preferably, the material comprises a polyarylene sulfide coating, which in particular may include polyphenylene sulfide, polynapthylene sulfide, polyanthracene sulfide and the lower-alkyl substituted derivatives thereof. The polyarylene sulfide which is preferred is polyphenylene sulfide. The polyarylene sulfide may be applied to the thrust surfaces in accordance with various known techniques, many of which are discussed or referenced in U.S. Pat. No. 3,964,582, issued to Mitchell on June 22, 1976, the pertinent portions of which are hereby incorporated by reference. The polyphenylene sulfide may be obtained under the trade name RYTON, a registered trademark for a brand of polyphenylene sulfide marketed by Phillips Petroleum Company. The sulfide may also include a filler such as glass beads, glass powder, or glass fibers. Other examples of fillers are polytetrafluoroethylene (Teflon) powder, molybdenum sulfide, titanium dioxide, and metallic particles such as iron, copper, etc.

The polyarylene sulfide may be applied as a powder or as a slurry, and may be sprayed upon the surfaces of the driving member, or it may be sintered, or it may be applied by fluidized bed coating. After such application, induction heating or any other standard heating method may be employed, typically at a temperature of at least 700° F., to cure the coating. Other specific methods for applying and curing the coatings are discussed in the cited patent to Mitchell.

The driven member 21, and preferably the cover 23, defines a shear fluid reservoir 32 which is most suitably located at the center of the cover. More particularly, the cover includes a central cavity 33 covered by a circular plate 34 received within a recess 35. A spring valve 36 is secured with a pin 37 to the plate 34. The plate defines a passageway 38 communicating between the reservoir 32 and working chamber 24. The spring valve 36 is shown in three different positions 39, 40 and 75, with the weight 72 shown only in the position 40 for purposes of simplicity and clarity of the figure. The spring valve 36 is urged toward a first position 39, in which it substantially blocks the passageway 38 and limits the flow of shear fluid from the reservoir to the working chamber. The spring valve also is urged toward a second position 40 in which its free end is spaced apart from the plate 34 and leaves the passageway 38 open to permit shear fluid flow from the reservoir to the working chamber.

According to the preferred embodiment of this invention the change from partially engaged to fully engaged in a temperature responsive, viscous fan drive coupling for an internal combustion engine is modulated by placing a weight on the valve arm which opens and closes a port to control fluid communication between the reservoir chamber and the drive chamber. During operation of the fan drive, the weight and the fan are continuously rotating, thereby creating a centrifugal moment or force on this valve arm. Thus, not only is the opening or the closing of the valve port controlled by the air or other monitored temperature, but also by the speed of the driven member.

In the preferred embodiment of the present invention there is included a spring valve having a weight secured thereto. This weighted valve assembly provides a means for causing modulated coupling of the driving and driven members. The weighted valve assembly also operates in conjunction with a bimetal spring 66 and pin 67 to comprise a control means for controlling flow of shear fluid from the reservoir to the working and shear chambers.

Below a determinable temperature, the bimetal spring 66 applies a load axially through pin 67 against the spring valve 36. The spring valve 36 is mounted to the plate 34 to have a normal unloaded position corresponding to an angling from the plate 34 at an angle greater than that of position 40. This results in a load being applied against the load of the bimetal spring 66. The loading of the bimetal spring and of the spring valve is preselected to have the load of the bimetal spring slightly greater to cause the spring valve to be normally held in the closed position 39 below the selected temperature.

When the temperature sensed by the bimetal spring increases sufficiently, the bimetal spring bends outwardly from the spring valve, thereby reducing the load applied through the pin 67 and permitting the spring valve to move toward the second position 40. This results in the flow of shear fluid from the reservoir, through the passageway 38 and into the working chamber. This fluid produces coupling between the driving and driven members and the driven member picks up speed. As this occurs, the weight 72 secured to the spring valve by mounting member 73 and rivet 74 is forced radially outward. It will be noted from the drawings that the mounting member 73 preferably positions the weight 72 axially displaced from the spring valve, thereby providing an increased axial force to urge the spring valve towards the closed position 39 in response to the radial force applied to the weight by rotation of the driven member.

With an appropriately sized weight, the passageway 38 will be substantially closed at a first speed. The coupling will therefore stabilize at this first speed when the bimetal valve senses a first temperature. It is desirable that the spring valve be spaced outwardly from the passageway 38 a slight distance greater than is the case of the uncoupled condition. This permits an increased flow of fluid into the working chamber to provide for the partial coupling of the driving and driven members. The spring valve does not assume either of the extreme positions 39 or 40 when partially coupled, but instead will assume various intermediate positions, such as 75.

As the degree of coupling and therefore speed of the driven member increases, the apparatus will stabilize with the spring valve at increasing distances from the passageway 38.

At a second, higher temperature, the bimetal valve will bend further. This will reduce the load applied to urge the spring valve to the closed position and the spring valve will move to further open the passageway 38. The increased fluid in the shear chamber which will then result will produce increased coupling. The driven member will increase to a second, higher rotational velocity. This will increase the force applied to the weight, and in turn will urge the spring valve toward the closed position. At some second, higher speed, the apparatus will be stabilized, with the spring valve being further from the passageway 38 than at the first coupling speed.

This stabilization at progressively higher speeds for progressively higher temperatures will continue up to full coupling of the driving and driven members. The space between the spring valve and the passageway will also increase incrementally with each stabilization condition. A similar, but reverse, situation will occur with cooling. As a result, the described control means provides for modulated coupling of the driving and driven members.

With increasing speed of the driven member, the axial load applied by the weight 72 will increase and will progressively move the spring valve toward the closed position 39. The weight must be properly selected to provide the desired closing effect. It will be appreciated that a large weight would cause the spring valve to close the hole at a relatively low speed of the driven member. This would effectively provide a maximum rotational velocity for the driven member. Conversely, a weight that is too small would substantially close the spring valve against passageway 38 only at a high rotational velocity. This would result in only a minimal modulation of the coupling. The desired weight for a given application may be determined in accordance with the characteristics of the coupling action that are sought.

The cover 23 is secured to the bearing housing 22 with bolts (not shown) received through aligned apertures in the outer perimeter of the cover and bearing housing. A perimetric seal 44 is received within an annular groove in the bearing housing and seals the driven member against fluid loss. Fins 45 and 46 preferably extend outwardly from the front and rear surfaces of the driven member to facilitate the dissipation of heat therefrom.

The driving member 11 includes several apertures extending from the first side to the second side of the driving member, and therefore permitting fluid flow from the first side to the second side. In particular, the driving member includes several first apertures 41 with which are associated grooves 42 extending through and connecting the annular grooves 17 of the driving member. The apertures 41 and associated grooves 42 operate to distribute shear fluid in the central part of the working chamber radially outward to the several annular grooves, and therefore into the fluid shear chamber defined by the opposed, shear surfaces of the driving and driven members.

The driving member also includes several second apertures 43 which similarly extend through the driving member from the first side to the second side, and also have associated grooves 42 for the purpose previously described. The second apertures preferably are displaced a small distance radially-outward of the first apertures 41 to enhance the flow of shear fluid from the center portion of the working chamber 24 to the backside of the driving member. In this manner, fluid control means are provided for maintaining shear fluid between the first and second thrust surfaces to enhance the axial thrust load carrying capabilities of these surfaces and to thereby protect the adjacent surfaces by providing a good supply of shear fluid for separating the respective thrust surfaces.

In the preferred embodiment, separate, first and second flow means are provided for distributing shear fluid from the working chamber back to the reservoir and to the shear chamber, respectively. An annular groove 47 is defined by the cover of the driven member and is positioned adjacent to and extending outwardly of the outer perimeter of the disc-shaped portion 15 of the driving member. The annular groove 47 is located on one side of the driving member. The driven member further defines a cylindrical cavity 48 which is aligned with and radially outward of the driving member. The cylindrical cavity 48 is therefore adjacent to and communicates with the annular groove 47, and provides for the flow of shear fluid through the cavity from the thrust surfaces to the groove 47.

In connection with the first flow means, an axial passageway 49 opens into the annular groove and also communicates with a radial passageway 50 which in turn opens into the reservoir 32. Shear fluid will consequently be forced from the fluid shear chamber and thrust chamber into the cylindrical cavity and annular groove, and through the passageways 49 and 50 back to the reservoir. At least one of each of such radial and axial passageways is provided communicating between the annular groove and the reservoir.

Similarly, the second flow means includes axial passageway 51 opening into the annular groove 47. Passageway 51 communicates with radial passageway 52 which in turn communicates with several passageways 53 which are positioned radially within the shear surfaces and which open into the shear chamber 24. In this fashion, the shear fluid which is circulated through the annular groove and cylindrical cavity to the passageways 51–53 is returned to the shear chamber to provide better distribution of shear fluid within the several grooves and ridges.

As is apparent from the drawings, the second flow means is separate from the working chamber and the reservoir and provides flow of shear fluid from a radially-outward location of the working chamber directly to a second radially inward location of the working chamber, the inward location being radially within the fluid shear chamber. More specifically in the preferred embodiment, the shear fluid is moved from the cylindrical cavity 48 and annular groove 47 back through the passageways 51–53 to the fluid shear chamber radially intermediate the several ridges and grooves of the driving and driven members.

The preferred embodiment has been described in which there are several discrete and separate passageways 53 connecting with the radial passageway 52 at different locations. Further, as shown in the drawings the preferred arrangement for the several passageways 53 is to have their openings radially aligned as shown specifically in FIG. 3. Modifications of this preferred embodiment are contemplated, and are intended to be covered hereby. For example, the opening of passageway 52 into the fluid shear chamber may comprise a single, elongated opening shown in FIG. 1 by the dashed lines 54 and 55. As represented by the dashed lines in FIG. 1, the elongated slot is preferably oriented radially and spans several of the annular ridges and grooves, thereby interconnecting the ridges and grooves. Also shown in FIG. 1, an additional passageway 56 extends between the radial passageway 52 and the working chamber radially-inward of the fluid shear surfaces. It is also preferred that a surface recess 57 extend along the driven member facing the working chamber and interconnecting the several passageways 53.

Figure 3:
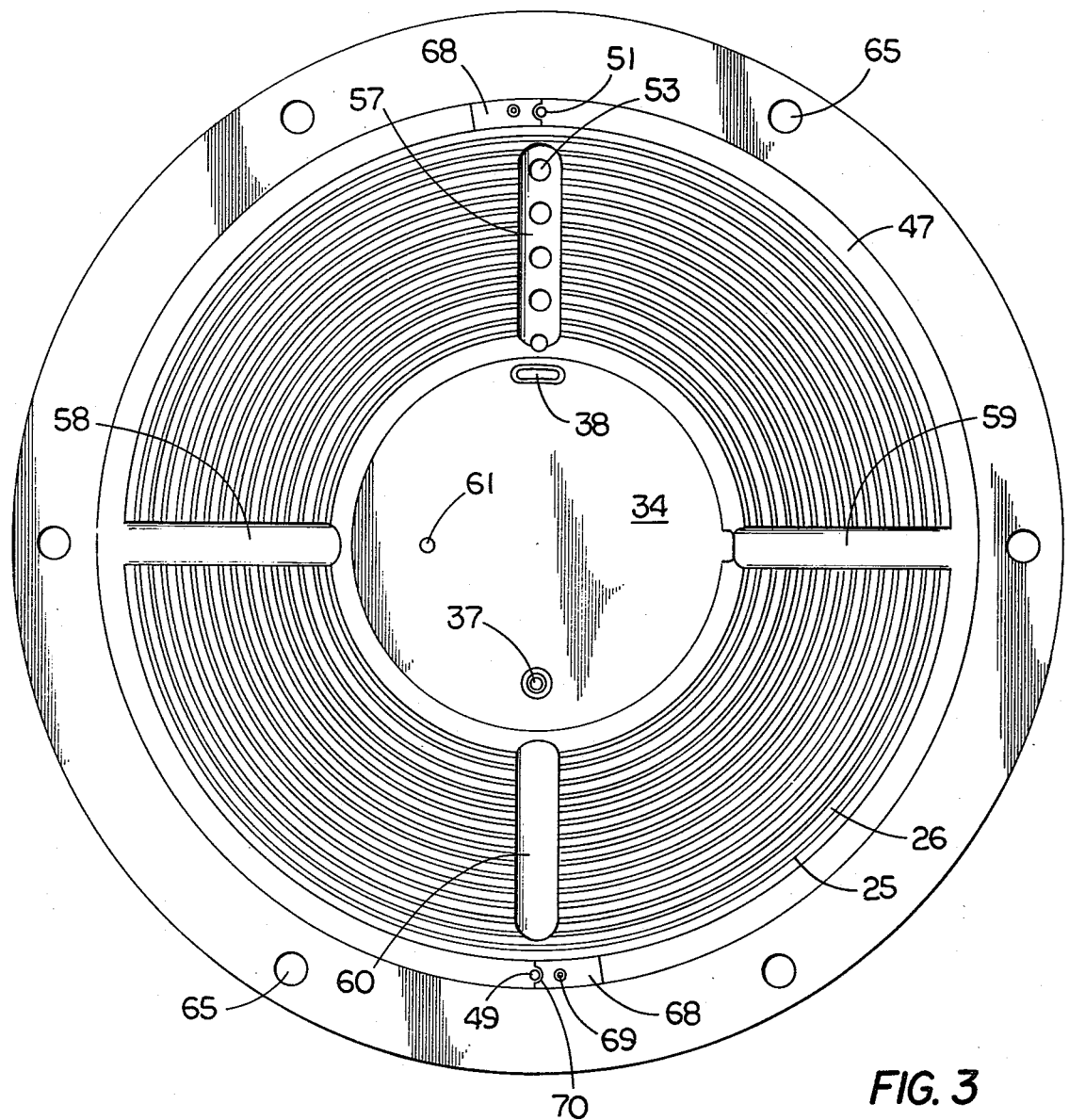
FIG. 3 is a rear, elevational view of the cover of the fluid shear coupling apparatus of FIG. 1.

Referring to FIG. 3, it is shown that the cover also includes suface recesses 58–60. Each of these recesses functions to facilitate distribution of the shear fluid within the working and shear chambers. More specifically, the surface recesses 58 and 59 extend the full radial location of the ridges and grooves and extends down into the annular groove 47 to provide fluid communication therewith. The surface recesses thereby facilitate the distribution of fluid through the shear chamber, and also provides a means for the shear fluid to readily distribute down into the annular groove. The surface recess 60 is diametrically opposed to the recess 57, and connects all of the ridges and grooves but does not extend down into the annular groove 47. The reason for this is that at this location is positioned the axial passageway 49 for providing recycle of the shear fluid back to the reservoir, and connection of the recess 60 into the annular groove 47 at this location would reduce the pressure and reduce the pumping action for the fluid to be returned to the reservoir.

In general, the provision of the passageways 53 and recess 57 substantially enhances the distribution of fluid within the fluid shear chamber. For example, when the shear fluid is delivered into the working chamber from the reservoir the fluid will gradually move radially outward into the annular groove 47, from which it is pumped back into the reservoir. It is a primary function of the present invention to provide a modulating fluid shear coupling, or in other words one which will have various intermediate speeds according to the amount of fluid contained in the working chamber. Without the provision of any of the surface recesses 57–60 and of the recycle through the passageways 53, the modulation would be substantially diminished since the shear fluid would require considerable time to attain a uniform level within the shear chamber. The surface depressions will operate to facilitate the reaching of a uniform level of the fluid by permitting a free passage of the fluid between the various grooves and ridges. In the same fashion, the provision of the recycling of shear fluid through the passageways 51–53 has been found to greatly enhance the modulating characteristics of the fluid shear drive.

As shown, the radial bearings are preferably located on the same side of the driving member as the first thrust surface, although the radial bearings may as well be located on the opposite side of the driving member. Also, it is preferable that the thrust surfaces extend opposite the ridges and grooves of the driving member, although alternate locations for the thrust surfaces may be employed. Particular first and second flow means have been described, but these may also be varied in accordance with structures and techniques known in the art. For example, the reservoir is preferably centrally located in the cover of the driven member, but with suitable modifications could be located either radially outward of the driving member or in the bearing housing of the driven member.

In a particular aspect of the present invention, there is provided a fluid shear coupling apparatus comprising a driving member received within a working chamber defined by the driven member. As shown in the preferred embodiment, the front side of the disc-shaped portion 15 of the driving member includes a first shear surface which is configured and positioned complementary to a first shear surface defined by the driven member, to define a fluid shear chamber therebetween which is cooperable with shear fluid within the chamber to transmit torque between the driving and driven members. In this aspect, the previously described first and second flow means are also provided. The first flow means provides flow of shear fluid between the reservoir and the working chamber. The first flow means therefore would include, for example, the flow of shear fluid from the reservoir through passageway 38 to the working chamber 24, as well as the return flow through the annular groove 48 and cylindrical cavity 47 and the passageways 49 and 50 back to the reservoir. It will be appreciated that in this aspect of the present invention the first flow means may employ different structures and techniques as understood in the art, which would provide the desired flow of fluid from the reservoir to the working chamber and back to the reservoir.

In this aspect of the invention, the second flow means provides flow of shear fluid from a radially-outward location, such as the cylindrical cavity 48 or annular groove 47, of the working chamber directly to a radially-inward location of the working chamber, such as the portion of the working chamber as communicated with through passageways 53. The second flow means therefore provides substantially continuous recirculation of shear fluid through the working chamber between these first and second locations.

In addition and apart from the second flow means, recirculation of the shear fluid may be provided on either the front or rear side, or both, of the driving member. In certain applications, it may be desirable only to recirculate the fluid to the front side of the driving member, such as in the case of a fluid shear coupling apparatus which does not include either shear surfaces or thrust surfaces on the rear side of the driving member. In this regard, the means for mounting the driven member to the driving member may include either the radial bearings, as previously defined, or combined radial and thrust bearings such as ball bearings or tapered roller bearings. It may therefore be that in particular embodiments of the present invention, the provision of thrust surfaces on the rear side of the driving member will not be necessary or desirable, and the provision of shear surfaces on the rear side of the driving member may or may not be included.

It will also therefore be understood that the provision of the apertures 41 and 43 is desirable in the preferred embodiment of the present invention, but it is not required in the case that recirculation of the shear fluid is intended only for one side of the driving member.

It will be noted that the second flow means is separate from the first flow means and the working chamber, and provides for a recirculation directly from the radially-outward location to the radially-inward location. The first flow means does provide recirculation under certain circumstances when the fluid is permitted to flow from the working chamber to the reservoir and back to the working chamber. However, as defined and described, the second flow means is separate from this first flow means which operates primarily to control the coupling of the driving and driven members in response to a monitored temperature or other parameter.

The present invention preferably includes a bleed hole 61 which communicates by suitable passageway means between the reservoir and the working chamber to permit shear fluid in the reservoir to pass through the bleed hole to the working chamber. Control means provide a first condition during which shear fluid moves through the first flow means from the reservoir to the working chamber to cause coupling of the driving member and driven member. Such control means may include, for example, the spring valve 36 in cooperation with the passageway 38, whereby the positioning of the spring valve in the second position 40 will permit shear fluid to pass through the passageway to the working chamber. Also, the control means provides a second condition in which the amount of shear fluid in the working chamber is limited and consequently produces reduced coupling between the driving and driven members. It will be appreciated that a certain amount of shear fluid will remain in the working chamber, and most typically in the area of the shear and/or thrust chambers, and this is desirable. However, the amount of shear fluid is sufficiently reduced to avoid significant coupling of the driving and driven members to provide the apparatus with an uncoupled condition.

The provision of the bleed hole connecting from the reservoir to the working chamber will permit a certain amount of shear fluid to be added to the working chamber during the uncoupled condition, with the spring valve, for example, being in the first position 39 blocking the passageway 38. The bleed hole is provided to permit a certain amount of recirculation of fluid from the reservoir and through the working chamber to maintain movement of the fluid within the working chamber, and particularly to assist in heat dissipation during the uncoupled condition. As a particular feature of the present invention, the bleed hole provides adequate shear fluid for recycling through the shear and/or thrust chambers as previously described. It will be understood that the flow rates of shear fluid to and from the reservoir will assume a steady state condition under which the amount of shear fluid returning to the reservoir is equal to that entering the working chamber through the bleed hole, and this amount of shear fluid in the working chamber will therefore be available for recycling. In accordance with certain embodiments of the present invention, the fluid entering the working chamber by means of the bleed hole may desirably be directed to the opposite side of the driving member, or may be directed to the opposite side of the driving member by the second flow means.

As shown in the preferred embodiment of the present invention, the passageway 38 and bleed hole 61 direct the shear fluid from the reservoir to the working chamber at a location radially-inward of the shear and/or thrust surfaces of the driving and driven members. Similarly, in the preferred embodiment the shear fluid returned to the reservoir from the working chamber is returned from a location radially-outward of the shear and/or thrust surfaces. It will be appreciated that particularly with respect to the recycle of shear fluid, the fluid need not be directed into the working chamber radially-inward of all portions of the shear and/or thrust surfaces, and need not be removed from the working chamber at a location which is radially-outward of all portions of the shear and/or thrust surfaces. It is sufficient that the shear fluid be recycled from a radially-outward location to a radially-inward location, and at least a portion of the shear and/or thrust surfaces intended to be accommodated by such recirculation lie between these locations. It is most preferable, however, that the shear fluid be introduced into the working chamber radially-inward of these surfaces, and that it be removed radially-outward of such surfaces.

In the preferred embodiment, the first flow means for directing the shear fluid to both sides of the driving member includes at least one, and preferably several, passageways defined by and extending through the driving member from the front side to the rear side, and most typically at a location radially-inward of the shear and/or thrust surfaces. Shear fluid entering the working chamber at or radially-inward of the passageways extending through the driving member will thereby be enabled to pass through the driving member to be distributed to both sides of the driving member. As described with respect to the preferred embodiment, the shear fluid directed to the working chamber from the reservoir through passageway 38 or bleed hole 61, will enter the working chamber at or radially-inward of such passageways through the driving member.

In the preferred embodiment, three such passageways or apertures 41 are positioned at a first radial location, and communicate with radial grooves 42 extending along the front side of the driving member. The grooves 42 are particularly useful in conjunction with the several ridges and grooves of the driving member defining the shear surfaces since the flow of shear fluid into each of these grooves is greatly facilitated. However, the grooves will also be useful for planar shear surfaces, as well as for planar or otherwise configured thrust or shear surfaces on the rear side of the driving member.

Also in the preferred embodiment, three additional passageways or apertures 43, also with associated grooves 42, are located at a second radial location to extend slightly outward of the apertures 41. These second apertures or passageways 43 distribute portions of shear fluid entering into these passageways to the opposite or rear side of the driving member.

The pumping action which drives the shear fluid through the passageways leading from the cylindrical cavity 48 and groove 47 may in general be achieved in accordance with structures known in the art. The outward force exerted on the shear fluid by the rotation of the driving member will typically create a pressure head which will force the fluid into and through the passageways leading from the annular groove 47. In a related aspect of the present invention, a particular structure is provided to enhance this pumping action, while also achieving the advantage of providing additional shear surfaces for torque transmission.

In connection with this aspect, the driving member includes a disc-shaped portion having a front side defining a shear surface and positioned complementary to a shear surface defined by the driven member. The driving member is received within a working chamber defined by the driven member, and the associated shear surfaces define a fluid shear chamber cooperable with shear fluid to transmit torque between the driving member and the driven member. Mounting means employing radial bearings, ball bearings, tapered roller bearings and the like provide for rotation of the driving and driven members about a common axis.

A particular flow means is provided for flowing shear fluid from the working chamber to the reservoir. This flow means includes an annular groove 47 defined by the driven member adjacent and extending outwardly of the outer perimeter 62 of the disc-shaped portion 15 of the driving member. This flow means also includes a cylindrical cavity 48 aligned with and radially outward of the driving member, which cylindrical cavity is adjacent to and communicates with the annular groove. A passageway 49 opens into the annular groove and extends to and communicates with the reservoir 33 by means of a second passageway 50.

Figure 5:
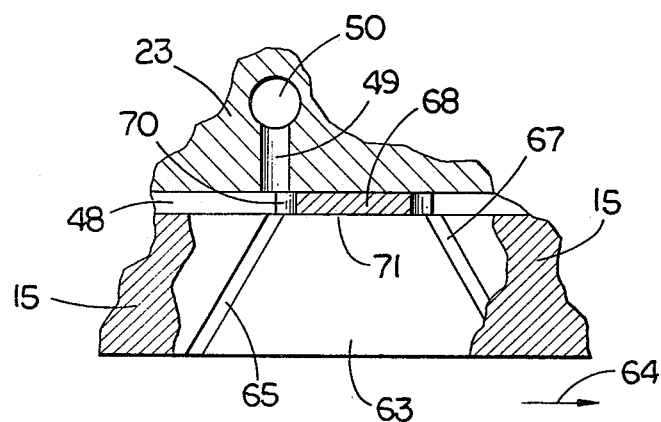
FIG. 5 is a partial, cross-sectional view of the apparatus of FIG. 1, taken along the line 5—5 in FIG. 4 and looking in the direction of the arrows.

This provides a projection 63 within the cylindrical cavity. For the purposes of description, the driving member 11 is considered to rotate in a first direction 64, and the projection 63 includes a front end surface 65 facing the rotation of the driving member. The front end surface 65 is located adjacent the opening of the passageway 49. More preferably, the passageway 49 is located in the first direction 64 from the front end surface of the projection. It is also preferable that the front end surface be angled toward the passageway 49, as shown particularly in FIG. 5, to direct shear fluid impinging upon the front end surface toward the passageway. The projection 63 is preferably a boss formed integral with the driven member, but alternatively may be an insert which is secured within the cavity by suitable means, such as a pin.

Figure 4:
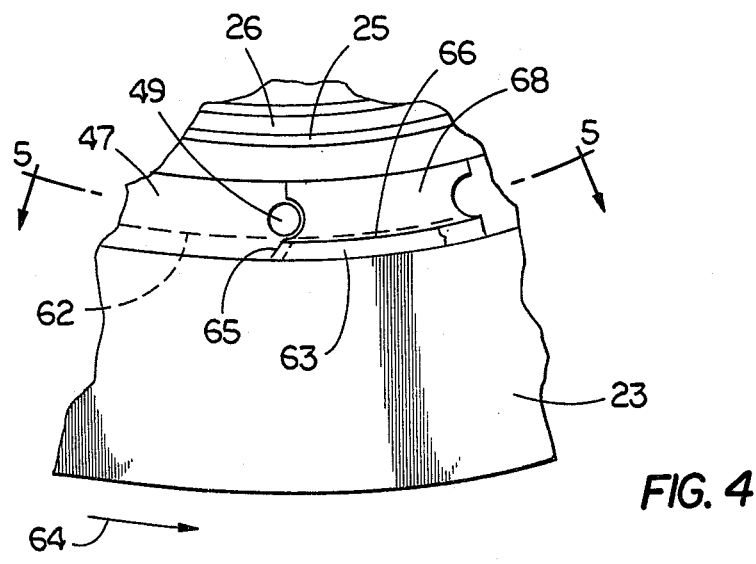
FIG. 4 is a partial, cross-sectional view of the cover, and particularly showing the location of a projection and dam with respect to the annular groove.

The projection 63 also includes a radially-inward, arcuate surface 66 which defines a shear surface. The arcuate surface 66 is located to be adjacent the outer perimeter 62 (FIG. 4) of the disc-shaped portion 15, and thereby defines a fluid shear chamber therebetween for the transmission of torque between the driving member and the driven member. The arcuate surfaces of the one or more projections extend for at least about 30% of the cylindrical cavity, and preferably not more than about 70% of the cavity. The front end surface 65 is suitably tapered to the bottom of the cylindrical cavity, as is shown particularly in FIG. 4, to facilitate the flow of shear fluid adjacent the projection and the perimeter of the driving member, and it is also preferable that the rear end surface 67 be similarly tapered.

The fluid shear coupling apparatus in this aspect also includes at least one dam 68 received within the annular groove 47, and preferably comprising a separate element secured within the groove by suitable means, such as a pin 69. The dam 68 includes a front end surface 70 facing the rotation of the driving member and positioned in the first direction from the opening of the passageway 49. The dam therefore operates in customary fashion to cause a pressure increase in the shear fluid adjacent the passageway 49, and therefore to cause the shear fluid to pass into and through the passageway. It will be seen that the angled front end surface 65 of the projection, and more generally the presence of the associated projection 63, will enhance the pumping action by causing a further blockage of flow of shear fluid around the cylindrical cavity. In addition, the side surface 71 of the dam is configured and positioned to define a shear surface which cooperates with a corresponding shear surface of the driving member to provide a shear chamber for the transmission of torque between the driving member and the driven member.

What is claimed is:

1. A fluid shear coupling apparatus which comprises:

a driving member including a disc-shaped portion having a front side and a rear side, the front side including a first shear surface;

a driven member defining a working chamber within which said driving member is received, said driven member including a first shear surface configured and positioned complementary to the first shear surface of said driving member to define a fluid shear chamber therebetween and cooperable with shear fluid in the fluid shear chamber to transmit torque between said driving member and said driven member;

mounting means for mounting said driven member to said driving member and rotatable about a common axis;

a shear fluid reservoir;

first flow means for providing flow of shear fluid between said reservoir and the working chamber;

second flow means, separate from the working chamber and said reservoir, for providing flow of shear fluid from a first, radially-outward location of the working chamber directly to a second, radially-inward location of the working chamber when shear fluid is contained within the working chamber, the second, radially-inward location being radially within the fluid shear chamber; and control means for providing at least a first condition during which shear fluid moves through said first flow means from said reservoir to the working chamber to cause coupling of said driving member and driven member and a second condition limiting shear fluid in the working chamber to cause reduced coupling.

2. The apparatus of claim 1 in which said second flow means includes at least one passageway defined by and extending through said driven member from the radially-outward location to the radially-inward location, the passageway opening into the working chamber at the radially-inward location.

3. The apparatus of claim 2 in which the passageway of said second flow means includes an elongated opening into the working chamber, the elongated opening extending radially.

4. The apparatus of claim 2 in which said second flow means is for providing flow of shear fluid from a first, radially-outward location of the working chamber directly to a plurality of radially-inward locations of the working chamber when shear fluid is contained within the working chamber, each of the plurality of radially-inward locations being radially within the fluid shear chamber.

5. The apparatus of claim 4 in which said second flow means includes at least one passageway defined by and extending through said driven member from the radially-outward location to each of the plurality of radially-inward locations, the passageway having a plurality of separate openings into the working chamber at the radially-inward locations.

6. The apparatus of claim 5 in which the plurality of openings are radially aligned.

7. The apparatus of claim 5 in which said driven member further includes a surface recess opening into the working chamber and connecting the plurality of openings.

8. The apparatus of claim 1 in which the front side of the disc-shaped portion of said driving member defines several annular ridges and grooves facing in an axial direction and in which said driven member defines several annular ridges and grooves facing in an axial direction and received adjacent respective grooves and ridges of said driving member, the grooves and ridges of said driving member and of said driven member providing spaced, opposed shear surfaces defining a fluid shear chamber therebetween.

9. The apparatus of claim 8 in which said second flow means includes at least one passageway defined by and extending through said driven member from the radially-outward location to the radially-inward location, the passageway opening into the working chamber at the radially-inward location and radially within the several annular ridges and grooves of said driven member.

10. The apparatus of claim 9 in which the passageway of said second flow means includes an elongated opening into the working chamber, the elongated opening being radially oriented and spanning at least a plurality of ridges and grooves of said driven member.

11. The apparatus of claim 9 in which said second flow means is for providing flow of shear fluid from a first, radially-outward location of the working chamber directly to a plurality of radially-inward locations of the working chamber when shear fluid is contained within the working chamber, each of the plurality of radially-inward locations being radially within the fluid shear chamber.

12. The apparatus of claim 11 in which said second flow means includes at least one passageway defined by and extending through said driven member from the radially-outward location to each of the plurality of radially-inward locations, the passageway having a plurality of separate openings into the working chamber at the radially-inward locations.

13. The apparatus of claim 12 in which the plurality of openings are radially aligned.

14. The apparatus of claim 12 in which said driven member further includes a surface recess opening into the working chamber and connecting the plurality of openings.

15. The apparatus of claim 8 in which at least one of said driving and driven members includes a surface recess spanning and interconnecting a plurality of ridges and grooves.

16. The apparatus of claim 15 in which said driven member includes a surface recess extending radially across and connecting each of the ridges and grooves of said driven member.

17. The apparatus of claim 16 in which said driven member defines an annular groove adjacent the outer perimeter of the shear chamber, at least one of the surface recesses extending to and communicating with the annular groove.

18. The apparatus of claim 16 in which said driving member includes a surface recess extending radially across and connecting each of the ridges and grooves of said driving member.

19. The apparatus of claim 1 in which said control means includes modulation means for providing several different flow rates of shear fluid from the reservoir to the working chamber to provide several different corresponding degrees of coupling between the driving and driven members.

* * * * *